United States Patent [19]
Strolle et al.

[11] Patent Number: 6,005,640
[45] Date of Patent: Dec. 21, 1999

[54] MULTIPLE MODULATION FORMAT TELEVISION SIGNAL RECEIVER SYSTEM

[75] Inventors: Christopher H. Strolle, Montgomery, Pa.; Steven T. Jaffe, Monmouth, N.J.

[73] Assignee: Sarnoff Corporation, Princeton, N.J.

[21] Appl. No.: 08/721,867

[22] Filed: Sep. 27, 1996

[51] Int. Cl.⁶ ............................................... H04N 5/455
[52] U.S. Cl. ........................ 348/726; 348/555; 348/558; 348/426; 348/720; 348/614; 375/235; 375/348
[58] Field of Search ............................ 375/233, 232, 375/235, 346, 348, 229, 216; 348/726, 544, 555, 556, 558, 10, 11, 426, 720, 614; 455/3.2, 6.2, 6.3

[56] References Cited

U.S. PATENT DOCUMENTS

| | | | |
|---|---|---|---|
| 4,004,226 | 1/1977 | Qureshi et al. | 325/42 |
| 4,035,725 | 7/1977 | Guidoux | 325/42 |
| 4,286,283 | 8/1981 | Clemens | 358/11 |
| 4,422,175 | 12/1983 | Bingham et al. | 375/14 |
| 4,520,386 | 5/1985 | Asaida | 358/13 |
| 4,620,159 | 10/1986 | Yoshida et al. | 329/50 |
| 4,730,345 | 3/1988 | Reeve, III | 375/77 |
| 4,985,900 | 1/1991 | Rhind et al. | 375/10 |
| 5,228,060 | 7/1993 | Uchiyama | 375/75 |
| 5,282,019 | 1/1994 | Basile et al. | 358/12 |
| 5,287,180 | 2/1994 | White | 348/484 |
| 5,299,004 | 3/1994 | Joo et al. | 348/614 |
| 5,311,546 | 5/1994 | Paik et al. | 375/14 |
| 5,315,619 | 5/1994 | Bhatt | 375/94 |
| 5,321,512 | 6/1994 | Huang | 348/607 |
| 5,353,312 | 10/1994 | Cupo et al. | 375/106 |
| 5,386,239 | 1/1995 | Wang et al. | 348/472 |
| 5,416,802 | 5/1995 | Ishii | 375/316 |
| 5,418,815 | 5/1995 | Ishikawa et al. | 375/216 |
| 5,448,300 | 9/1995 | Yamada et al. | 348/571 |
| 5,461,427 | 10/1995 | Duffield et al. | 348/555 |
| 5,471,508 | 11/1995 | Koslov | 375/344 |
| 5,475,442 | 12/1995 | Matsushita et al. | 348/554 |
| 5,477,199 | 12/1995 | Montreuil | 332/103 |
| 5,506,636 | 4/1996 | Patel et al. | 348/725 |
| 5,517,213 | 5/1996 | Bhatt et al. | 375/323 |
| 5,526,378 | 6/1996 | Knutson et al. | 375/229 |
| 5,550,596 | 8/1996 | Strolle et al. | 348/607 |
| 5,581,585 | 12/1996 | Takatori et al. | 375/376 |
| 5,598,221 | 1/1997 | Miyahara et al. | 348/554 |
| 5,604,741 | 2/1997 | Samueli et al. | 370/402 |
| 5,627,885 | 5/1997 | Paneth et al. | 379/93 |
| 5,661,528 | 8/1997 | Han | 348/607 |
| 5,666,170 | 9/1997 | Stewart | 348/726 |
| 5,671,253 | 9/1997 | Stewart | 375/316 |
| 5,675,612 | 10/1997 | Solve et al. | 375/326 |
| 5,706,057 | 1/1998 | Strolle et al. | 348/426 |
| 5,712,873 | 1/1998 | Shiue et al. | 375/233 |
| 5,742,679 | 4/1998 | Olafsson | 380/9 |
| 5,745,525 | 4/1998 | Hunsinger et al. | 375/285 |
| 5,825,833 | 10/1998 | Sakaue | 375/344 |

FOREIGN PATENT DOCUMENTS

| | | | |
|---|---|---|---|
| EP 0 617 551 A1 | 9/1994 | European Pat. Off. | H04N 5/21 |
| EP 0 676 880 A2 | 10/1995 | European Pat. Off. | H04L 27/00 |
| EP 0 717 559 A2 | 6/1996 | European Pat. Off. | H04N 5/21 |
| WO 95/26074 | 9/1995 | WIPO | H03D 1/24 |
| WO 95/26075 | 9/1995 | WIPO | H03N 7/30 |
| WO 95/26101 | 9/1995 | WIPO | H04N 5/455 |

OTHER PUBLICATIONS

European Search Report dated 21 May 1999.

*Primary Examiner*—Andrew I. Faile
*Assistant Examiner*—Uyen Le
*Attorney, Agent, or Firm*—William J. Burke

[57] ABSTRACT

A television receiver for processing both analog television signals and digital television signals. Specifically, the television receiver contains a RF/IF front end, an analog-to-digital converter that samples a near baseband signal using a "free running" sample rate, and a combined demodulator that demodulates the digitized analog television signals or the sampled digital television signals. The combined demodulator recovers both pilot and pix carriers as well as provide a passband adaptive equalizer that removes ghosts from analog television signals and intersymbol interference from digital television signals.

20 Claims, 9 Drawing Sheets

NCO FREQUENCY
QAM: φ
VSB: .25 Fs
NTSC: .31 Fs

MULTIPLE MODULATION FORMAT TELEVISION SIGNAL RECEIVER SYSTEM

The present application is related to commonly assigned, co-pending patent application Ser. No. 08/721,663, filed Sep. 26, 1996 (Attorney Docket Number 11616A) which is a continuation-in-part application of patent application Ser. No. 08/602,943, filed Feb. 16, 1996.

The present invention relates to a system for receiving and processing communications signals and, more particularly, to a system for receiving and processing both analog television signals and digital television signals.

BACKGROUND OF THE INVENTION

Present broadcast television video signals in the United States are analog signals generated according to the National Television Systems Committee (NTSC) standard. Non-U.S. countries have similar standards such as the Phase Alteration Line (PAL) and Systeme Electronique Color Avec Memoire (SECAM) standards. In the future, these analog television signals, and television signals generated according to newly proposed standards for compressed digital video, e.g., using 16 or 256 level quadrature amplitude modulation (QAM) as well as vestigial sideband (VSB) and offset QAM (OQAM), will be broadcast in the United States, and may be transmitted along with NTSC signals from a single transmitting facility. Ideally, television receivers in the future should be able to receive video signals in multiple modulation formats.

Current proposals for such television receivers envision combining a known analog television signal receiver with a separate known digital television signal receiver. One such receiver is disclosed in U.S. Pat. No. 5,418,815 issued May 23, 1995. This is, effectively, two television receivers combined within a single enclosure. However, there are many signal processing elements which are common to the receiving circuitry for both forms of television signals. This means that such receivers will have circuit elements which are duplicated in the two receiver sections. This leads to increased costs and decreased reliability due to an increased number of components.

Therefore, there is a need in the art for a television receiver that receives both analog and digital television. Such a receiver should have only a single instance of components common to both types of receivers.

SUMMARY OF THE INVENTION

The disadvantages heretofore associated with the prior art are overcome by the present invention of a television receiver for receiving and processing analog television signals and digital television signals. Specifically, the television signal receiver of the present invention contains a tuner, an IF processor, and analog-to-digital converter (ADC), and a combined demodulator. The tuner and IF processor operate to receive, downconvert and filter both analog and digital television signals. The IF processor output is a near baseband signal. The ADC samples the near baseband signal using a "free running" sampling signal. The combined demodulator processes the sampled signal to extract audio and video signals from a received analog television signal and extract a data stream carrying audio and video information from a received digital television signal. The data stream is further processed by a digital decoder to extract the video and audio information from the data stream.

The combined demodulator contains a quadrature demodulator, a synchronizer and matched/Nyquist filter, a pilot and pix carrier tracking loop, an equalizer, a carrier tracking loop and an analog television signal processor. The quadrature demodulator produces in-phase (I) and a quadrature phase (Q) signals from the digitized near baseband signal. The I and Q signals are coupled to the synchronizer and matched/Nyquist Filter. The synchronizer and matched/Nyquist filter interpolates the I and Q signals to achieve optimal symbol sampling and filters the resampled signal using both a matched filter and a band edge filter. The I and Q signals that are band edge filtered are used for timing synchronization of the resampling process. A single circuit, the pilot and pix carrier tracking circuit, is used to track both a VSB signal pilot tone and an NTSC signal pix tone. The equalizer is a passband adaptive equalizer that provides both ghost suppression for analog television signals and intersymbol interference reduction for digital television signals. The passband equalized signal is derotated to form a baseband signal and then quantized. The quantized signal is coupled to a carrier recovery circuit that phase locks an oscillator to the symbol signals. The baseband signal is coupled to an analog signal processor that recovers the video and audio signal components from the digitized analog television signal. The symbol samples are coupled to a digital decoder that extracts the video and audio signals from the symbol stream.

A television receiver arranged in this manner will include the minimum signal processing elements necessary to process both analog television signals and digital television signals, thus saving costs and increasing reliability.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
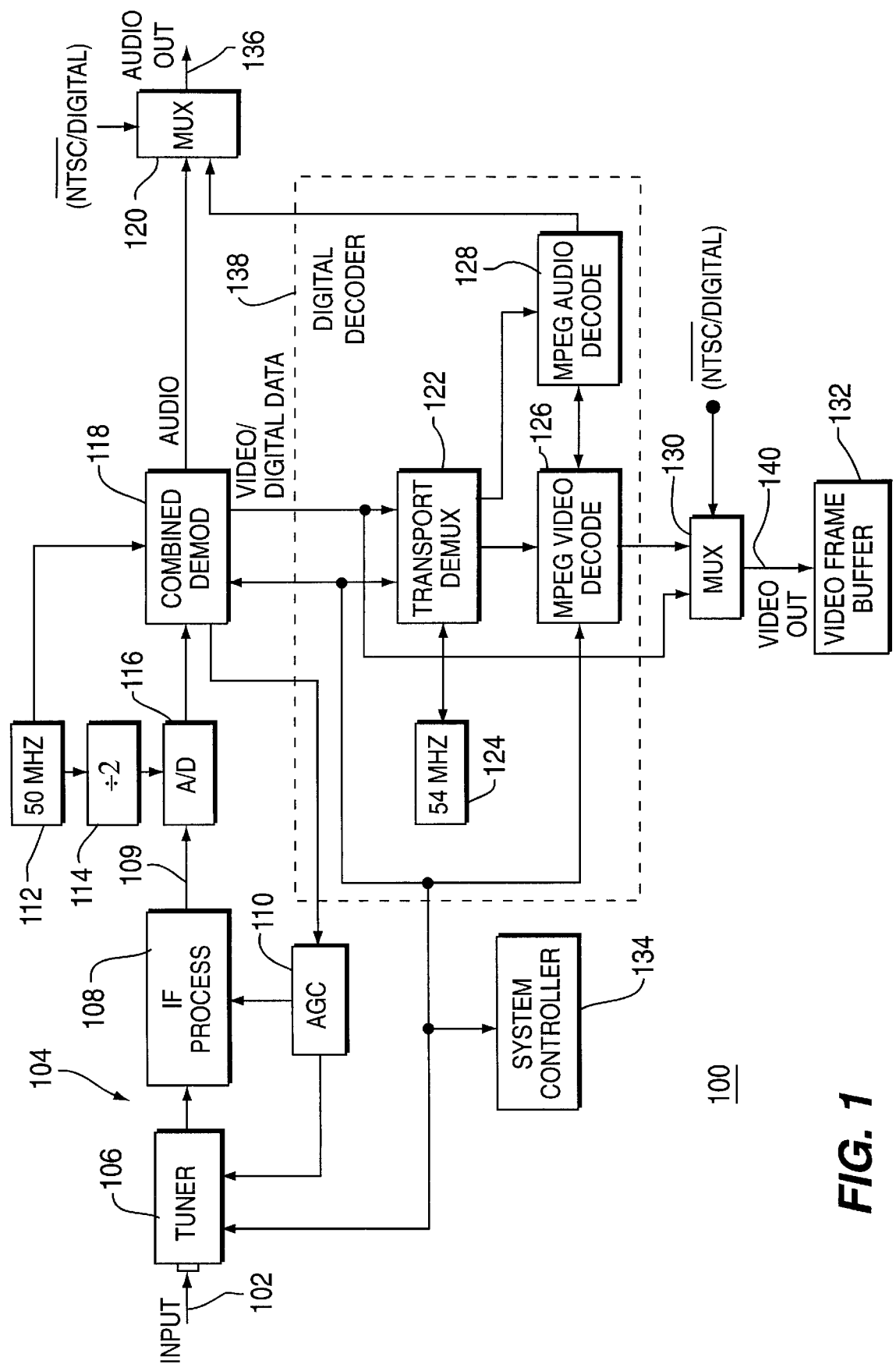
FIG. 1 is a block diagram illustrating a television receiver system incorporating the present invention.

FIG. 1 is a block diagram of a television signal receiver system 100 incorporating the present invention. The system 100 contains a conventional receiver RF/IF front end 104, an analog-to-digital (A/D) converter 116, a combined demodulator 118, a digital signal decoder 138, a system controller 134, and output multiplexers 120 and 130. The input signal, (on port 102), to the receiver front end 104 may be sourced from a conventional television antenna, satellite receiver antenna and downconverter, cable television system and the like. This signal is either a conventional analog television signal, e.g., an NTSC, PAL, SECAM and the like compliant television signal, or a digital television signal, e.g., QAM, VSB, OQAM and the like.

The RF/IF front end 104 includes a tuner 106, an IF processor 108 and an automatic gain control (AGC) bias circuit 110. In a conventional manner, the tuner 106 includes an RF amplifier, a signal downconverter, an IF amplifier, and the like. These components are arranged and fabricated in a known manner. The IF processor 108 generally contains a fixed gain amplifier, a saw filter, a voltage controlled amplifier, and an isolation transformer, all of which are connected in series. In addition, both the tuner and the IF processor contain voltage controlled amplifiers that alter the gain of each stage of the RF/IF front end depending on the magnitude of an AGC signal. The AGC signal is coupled from the combined demodulator 118 through the AGC bias circuitry 110 to the voltage controlled amplifier within the tuner and the IF processor. Such gain control circuits are well known in the art. The elements of the RF/IF front end 104 generate a near baseband signal on path 109.

The output of the RF/IF front end 104 is coupled via path 109 to an analog-to-digital (A/D) converter 116. The A/D converter 116 samples the hear base band signal at a sampling rate that is fixed by oscillator 112. For example, oscillator 112 provides a 50 MHz signal to a frequency divider 114 circuit that divides the frequency in half such that the A/D converter 116 samples the near base band signal at a 25 MHz rate. A digital signal generated by the A/D converter is coupled to the combined demodulator 118. The combined demodulator running at a clock speed of 50 MHz supplied from the 50 MHz oscillator 112, processes the digitized signals to produce audio and video data as well as the AGC bias signal. Specifically, the combined demodulator produces digitized video and audio in response to a received analog television signal and produces a digital data in response to a received digital television signal.

Digital decoder 138 processes the digital data generated by the combined demodulator 118 and produces an analog video and audio signal for display. Specifically the digital decoder contains circuitry for decoding the packetized digital television signal. Typically, the digital television signal is encoded using standard video encoding routines such as the Moving Pictures Experts Group (MPEG) standard. The MPEG standards include both a signal compression protocol and a signal transport protocol. To facilitate decoding of both the transport and the compression information, to the decoder 138 contains a transport demultiplexer 122 as well as an MPEG video decoder 126 and an MPEG audio decoder 128. The transport demultiplexer 122 is coupled to a 54 MHz oscillator 124. The transport demultiplexer, the MPEG video decoder and the MPEG audio decoder all function in accordance with principles that are well known in the art. This circuitry is generally available as a set of integrated circuits from, for example, LSI Logic as model L64002.

The system 100 is controlled by a system controller 134 that provides control signals for tuning the RF/IF front end 104 for controlling the digital decoder 138 and the combined demodulator 118. In addition, the selection of whether an analog signal or a digital television signal is received and demodulated is accomplished using the system controller as well as the multiplexers 120 and 130. The analog or digital signal reception is generally automatically accomplished by monitoring the signals within the combined demodulator. If the demodulated signals fit a certain criteria, the system controller deems the signals are from an analog television source, while other criteria are fulfilled by certain digital signal sources. In response to this decision, the multiplexers are switched to transfer one port or the other to the multiplexer output port. As such, multiplexer 120 either transfers digital audio or analog audio to the output port 136 and multiplexer 130 selects either digital video or analog video for connection to the output port 140. The video signal selected by the multiplexer 130 is coupled to a video frame buffer 132 from which a video display (not shown) may retrieve frames of video information for display.

Figure 2:
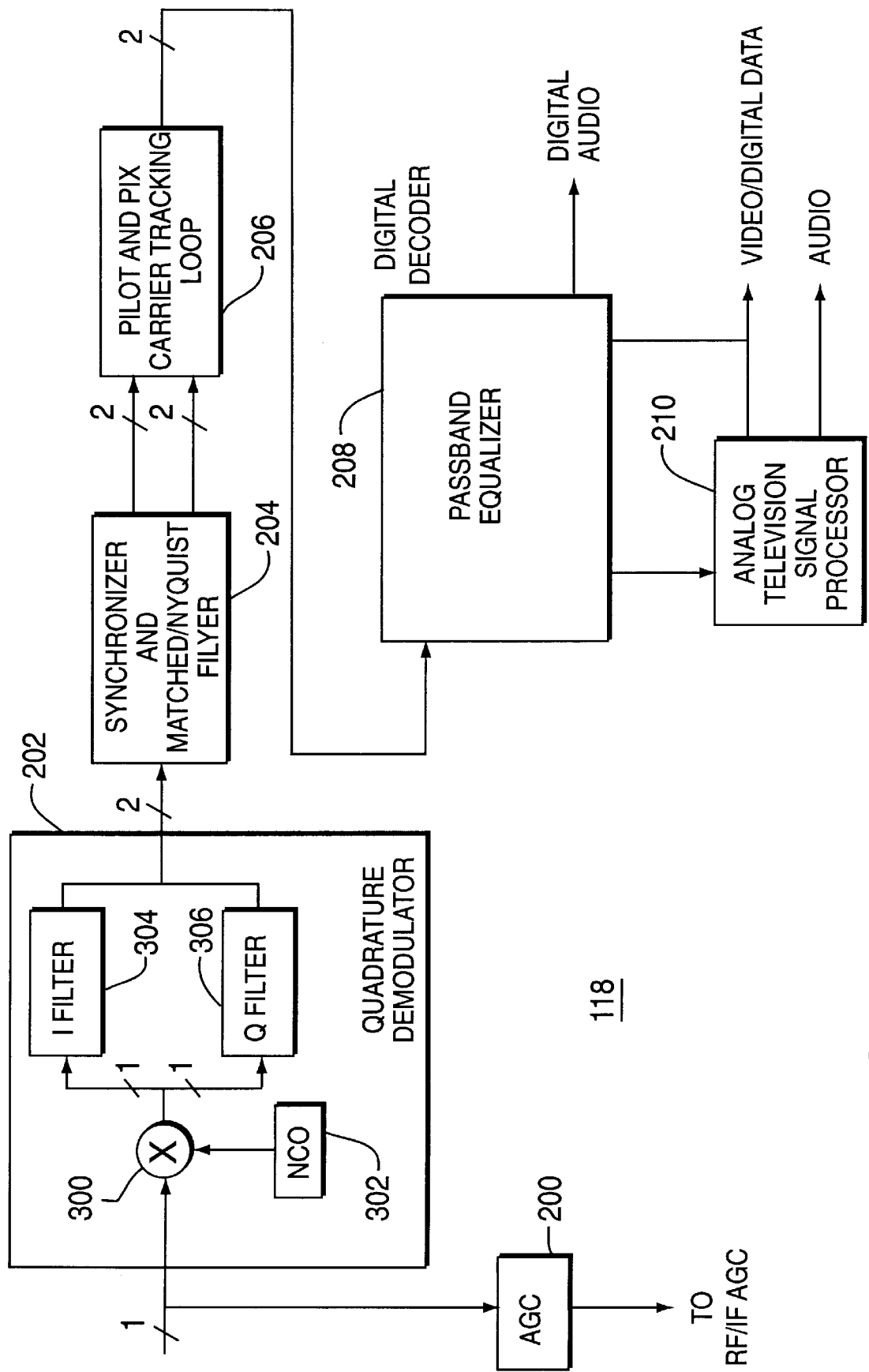
FIG. 2 depicts a detailed block diagram of a combined demodulator.

FIG. 2 depicts a block diagram of the combined demodulator 118 of FIG. 1. The combined demodulator contains an AGC circuit 200, a quadrature demodulator 202, a synchronizer and matched/Nyquist Filter 204, a carrier tracking loop 206, a passband equalizer 208 and an analog television signal processor 210. The digitized near baseband signals produced by the A/D converter are supplied to the quadrature demodulator 202 as well as AGC circuit 200. The AGC circuit 200 generates a DC voltage indicative of the amplitude of the signal that is received. This AGC control voltage is coupled to the voltage controlled amplifiers in the RF/IF front end. The AGC circuit 200 is discussed in detail with respect to FIG. 3 below.

The quadrature demodulator 202 operates upon the digitized input signal and produces a pair of signals at the output (e.g., a complex signal containing in-phase and quadrature phase data). The demodulator 202 contains a mixer 300, a numerically controlled oscillator 302, a first filter 304, a second filter 306. Mixer 300 operates as a quadrature demodulator generating an I and Q data signals from the near baseband digital input signal. The numerically controlled oscillator has a first frequency when demodulating QAM and VSB signals. That frequency being −0.25 of the symbol rate ($F_s$). Additionally, when demodulating an analog television signal such as NTSC formatted signals, the numerically controlled oscillator 302 has a center frequency of −0.305 of the symbol rate ($F_s$). Hereinafter, the symbol rate $F_s$ is the QAM symbol rate such that the demodulator circuitry generally is clocked at $2F_s$, except that the quadrature demodulator is clocked at $4F_s$. The I data is coupled to filter 304 and Q data is coupled to filter 306. These filters are low pass filters which remove higher level harmonics from the demodulated signal. The offset of the NCO frequency is used to enable the filters to function for both analog and digital signals. Additionally, these filters provide 3d13 of attenuation of the picture carrier frequency NTSC.

The synchronizer and the matched/Nyquist filter 204 performs signal synchronization when the input signal is a digital television signal and performs matched/Nyquist filtering on all signals. The filter 204 produce a quadrature high pass signal and a complementary, quadrature low pass signal that form inputs to the pilot and pix carrier tracking loop 206. The pilot and pix carrier tracking loop 206 provides carrier tracking for VSB and analog television signals and shall be discussed below with respect to FIG. 8. This loop is bypassed (disabled) for processing QAM signals.

The passband equalizer 208 provides ghost suppression for analog television signals and intersymbol interference (ISI) filtering for digital television signals. One output of the equalizer 208 is coupled to an analog television signal processor 210 that operates in a conventional manner to extract luminance, chrominance and audio signals from the digitized analog television signal. A second output of the equalizer carriers quantized symbol values that are further processed by the digital decoder 138 of FIG. 1.

Figure 3:
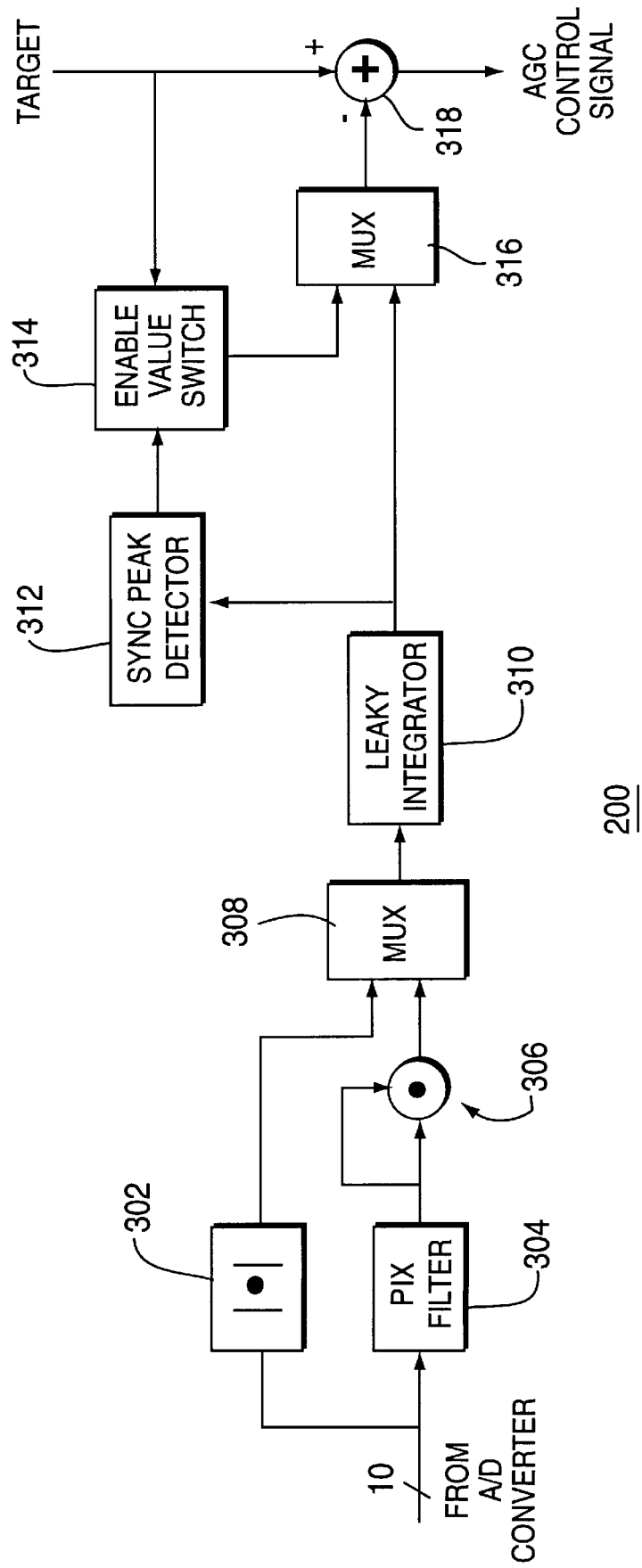
FIG. 3 depicts a block diagram of an AGC circuit.

FIG. 3 depicts a block diagram of the AGC circuit 200 which produces an amplifier control signal indicative of the amplitude of any received signal. As such, this circuit is capable of producing the control signal for both analog and digital television signals. Specifically, the output of the A/D converter (116 of FIG. 1), a ten bit signal, is coupled to both an absolute value converter 302 and a pix carrier filter 304. The absolute value of the input signal is coupled to a first input terminal of a multiplexer 308. The pix carrier filter 304 is a bandpass filter centered at the picture carrier frequency. The output of the filter is squared, in squarer 306, and coupled to the second input terminal of multiplexer 308. The multiplexer selects the first input terminal when QAM signals are received and selects the second input terminal when the signals containing carriers (e.g., NTSC, VSB and the like) are received.

The output of the multiplexer 308 is coupled to a "leaky" integrator 310. The output of the leaky integrator is coupled to the first input terminal of multiplexer 316 and a sync peak detector 312. Since the signal level of an analog television signal is time variant, the AGC circuit must only be active during portions of the signal that have a stable amplitude, e.g., during the sync interval. In contrast, a QAM signal has a statistically uniform amplitude. To control the AGC activation while receiving an analog television signal, the sync peak detector tracts the amplitude of the digitized analog signal and produces an AGC disable signal on path 313. The sync peak detector determines when the received analog signal is within the sync interval and enables the AGC circuit during the interval. For the remainder of the analog television signal the AGC circuit is disabled. In operation, the control signal is coupled to an "enable value" switch 314 that couples target value to the second terminal of the multiplexer 316 at appropriate times, e.g. during all time other than the sync interval.

The multiplexer 316 selects the first input terminal when a QAM signal is received and selects the second input terminal when other signals are received. The output of the multiplexer 316 is coupled to a subtractor 318, where this signal forms the subtrahend. A target value is coupled to another terminal of the subtractor. The output of the subtractor is a digital control signal that can be used for generating an amplifier control voltage. When the multiplexer selects the first input, the AGC circuit serves to produce the control signal. However, when the second input terminal is selected, both inputs to the subtractor are the target value and the control signal is zero, i.e., the AGC circuit is disabled. Consequently, a single AGC circuit processes both analog and digital television signals.

Figure 4:
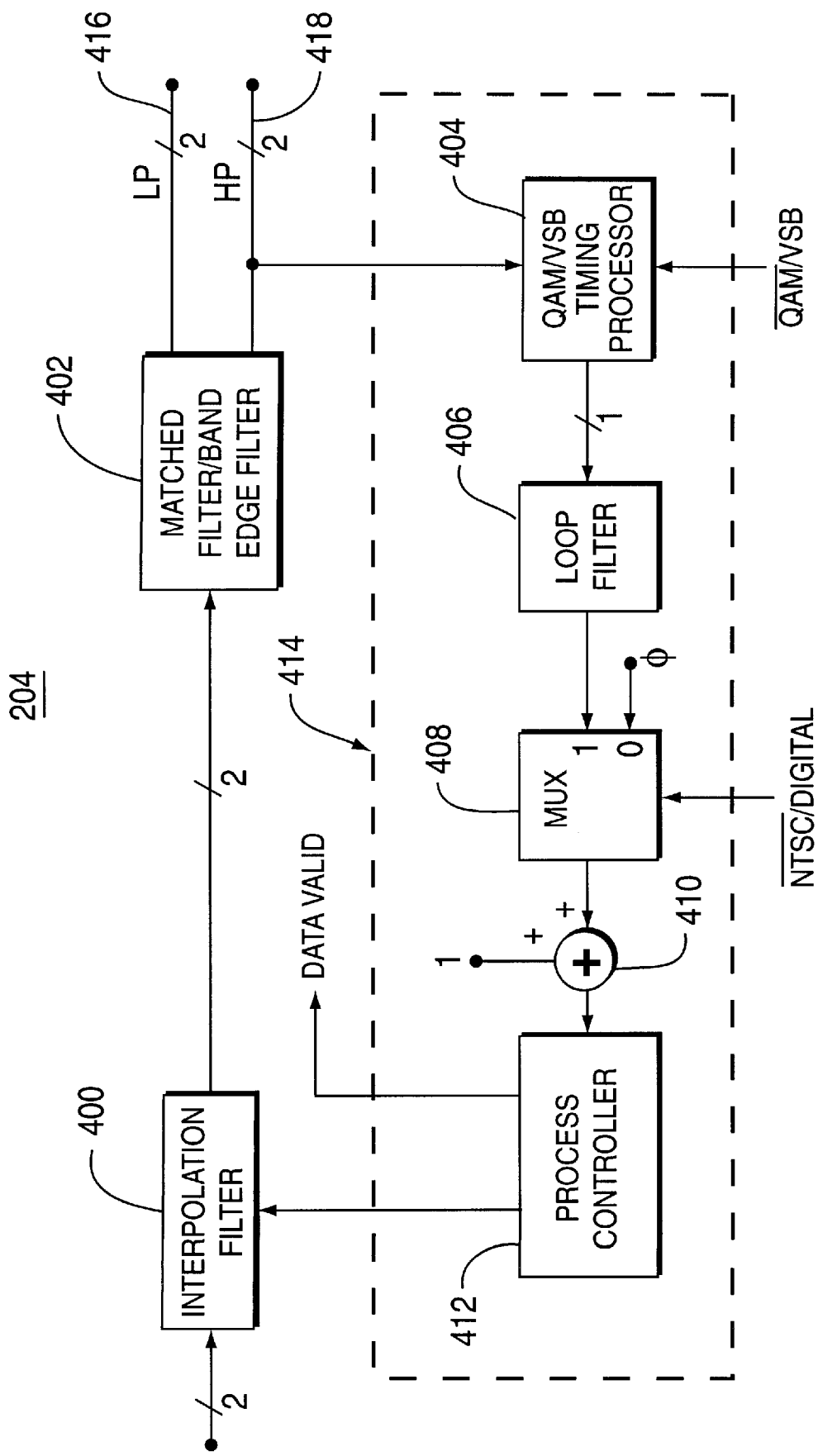
FIG. 4 depicts a block diagram of a synchronizer and matched/Nyquist filter.

FIG. 4 depicts a detailed block diagram of the synchronizer and matched Nyquist filter 204. This filter 204 contains an interpolation filter 400, a matched filter/band edge filter 402 and a timing loop 414. The timing loop is disabled when receiving analog television signals and operates in both a QAM mode for QAM signals and a VSB mode for VSB and OQAM signals. Moreover, when receiving a digital signal, the interpolation filter resamples those signals using interpolative sampling in response to a sampling signal generated by the timing loop 414. The interpolation filter, in essence, resamples the symbols at an optimal sampling point. The interpolated signals for both I and Q data are passed through the matched filter/band edge filter 402. This filter contains a matched filter (e.g., an anti-aliasing filter), as well as a band edge filter which has a response that is a compliment of the band edge of the matched filter. The matched/band-edge filter is described in detail with respect to FIG. 6. To facilitate filtering both I and Q data, there are two of these matched filters/band edge filters, one for I-data and one for Q-data. In operation, the filters 402 produce, at their respective first output terminals 416, a low pass filtered output signal matched to the transmitted pulse shape. These output signals are supplied to the pilot and pix carrier tracking loop (206 of FIG. 2). The filters 402 also produce, at the respective second output terminals 418, a complimentary high pass filtered output signal which is used for band edge timing recovery performed by the timing loop 414.

The timing loop 414 contains a QAM/VSB timing processor 404, a loop filter 406, a multiplexer 408, an adder 410 and a process controller 412. The timing processor 404 produces an error signal from the high pass filtered I and Q data signals. The timing processor is discussed in detail with respect to FIG. 5. The error signal is filtered by the loop filter The error signal is filtered by the loop filter 406 and the output of the loop filter is coupled to the multiplexer 408. The multiplexer is used for enabling and disabling the timing recovery loop 414. In the analog mode, the multiplexer 408 is connected to its first input, which is 0, thus disabling the timing loop 414. Alternatively, while a digital television signal is being received, the multiplexer is switched to accept its second input and couple that input to its output. This enables the timing loop 414. The multiplexer output is coupled to an adder 410 which adds 1 to the value of the output of the loop filter.

The process controller 412 produces a timing signal which is used by the interpolation filter to resample the input I and Q data streams. In addition, the process controller produces a data valid signal which indicates that the system is operating in the digital television receiver mode and that the received data is valid.

Figure 5:
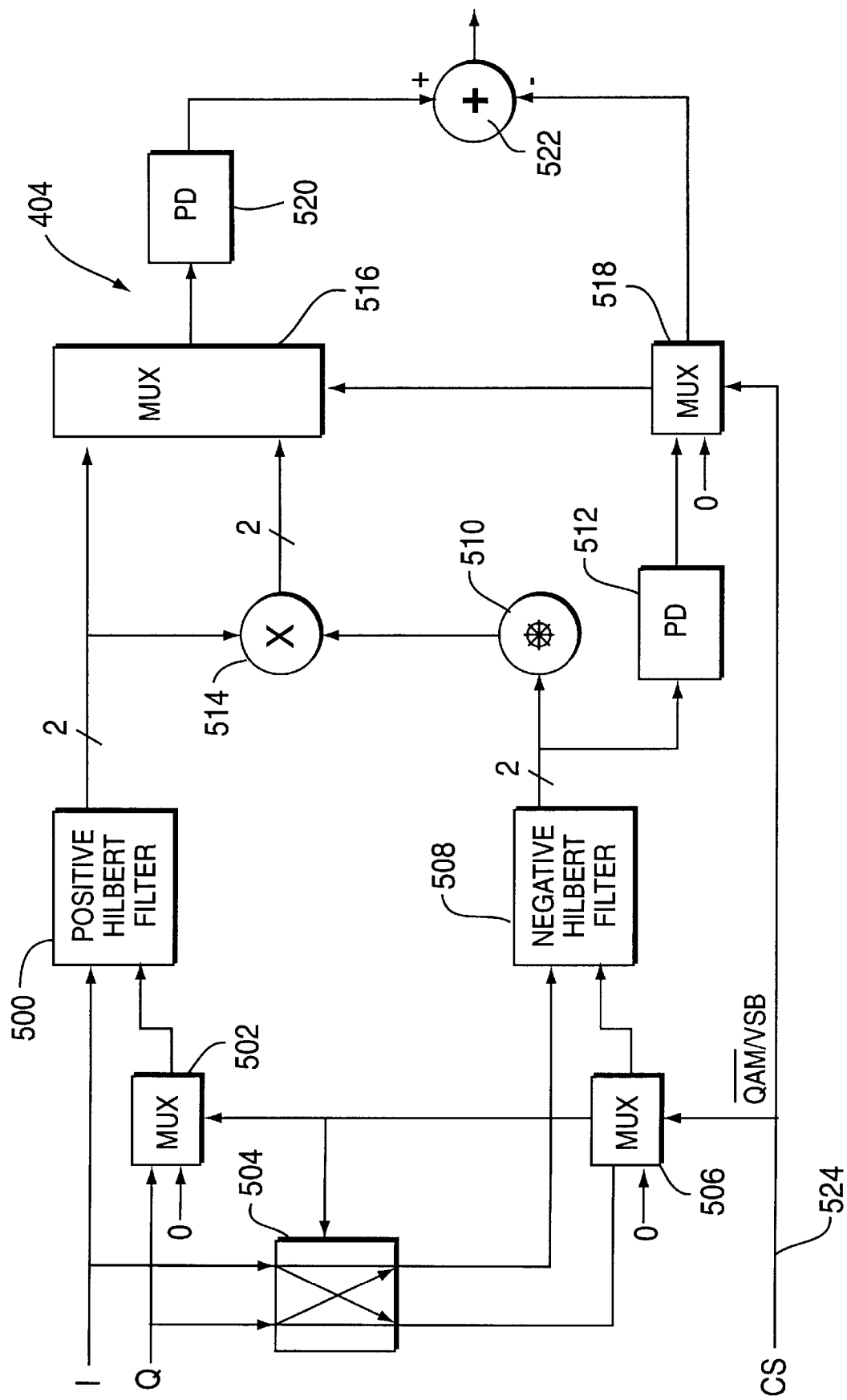
FIG. 5. depicts a block diagram of a QAM/VSB timing processor.

FIG. 5 depicts a block diagram of the QAM/VSB timing processor 404. A pair of input terminals I and Q receive real and imaginary component signals of a complex signal from the respective matched band edge filters 402 (of FIG. 4). The real component signal input terminal I, is coupled to a real input terminal of the first Hilbert filter 500, and to a real input terminal of a known and controllable I/Q swapper circuit 504. The imaginary component signal Q is coupled to a first data input terminal of a first multiplexer 502, and to an imaginary input terminal of the controllable I/Q swapper circuit 504. A zero value signal is coupled to the second data input terminal of the first multiplexer 502, and an output terminal of the first multiplexer 502 is coupled to an imaginary input terminal of the first Hilbert filter 500.

Respective real and imaginary output terminals of the first Hilbert filter 500 are coupled to a corresponding pair of data input terminals of a complex multiplexer 516 and complex multiplier 514. A pair of real and imaginary output terminals of the complex multiplier 514 is coupled to a second pair of data input terminals of the complex multiplexer 516. A pair of output terminals of the complex multiplexer 516 is coupled to a corresponding pair of input terminals of a phase detector (PD) 520, and an output terminal of the PD 520 is coupled to a noninverting input terminal of a subtractor 522. An output terminal of the subtractor 522 is coupled to the input terminal of the loop filter 406 (of FIG. 4).

A real output terminal of the controllable I/Q swapper circuit 504 is coupled to a first data input terminal of a second multiplexer 506. A zero value signal is coupled to a second data input terminal of the second multiplexer 506, and an output terminal of the second multiplexer 506 is coupled to an imaginary input terminal of the second Hilbert filter 508. Respective real and imaginary output terminals of the second Hilbert filter 508 are coupled to respective input terminals of the complex conjugation circuit 510, and to a second phase detector PD 512. A pair of real and imaginary output terminals of the complex conjugation circuit 510 are coupled to a corresponding second pair of input terminals of the complex multiplier 514.

An output terminal of the second PD 512 is coupled to a first data input terminal for the third multiplexer 518, and a zero value signal is coupled to a second data input terminal of the third multiplexer 518. An output terminal of the third multiplexer 518 is coupled to an inverting input terminal of the subtractor 522. A control signal input terminal CS is coupled to respective control input terminals of the first, second and third multiplexers 502, 506 and 518, to a control input terminal of the complex multiplexer 516, and to a control input terminal of the controllable I/Q swapper circuit 504.

In operation, the control signal from the control signal terminal CS has a first state when the timer loop is to be set to receive a VSB or OQAM signal, and has a second state when the loop is to be set to receive a QAM modulated signal.

When a VSB/OQAM signal is being received, the control signals conditions the multiplexers 502, 506, 516 and 518 and the controllable I/Q swapper circuit 504 to arrange the circuit in the particular arrangement. Specifically, in the VSB/OQAM mode, the controllable I/Q swapper circuit is conditioned to pass the signals at its input terminals to its output terminals unchanged. The first multiplexer 502 is conditioned to pass the signal from the Q input terminal to the first Hilbert filter 500, and the second multiplexer 506 is conditioned to pass the Q signal from the controllable I/Q swapper circuit 504 to the second Hilbert filter 508. The complex multiplexer 516 is conditioned to couple the signal from the complex multiplier 514 to the first phase detector 520 and the third multiplexer 518 is conditioned to pass the zero valued signal to the subtractor 522. In operation the high pass filtered I/Q signals from the matched band edge filter contains positive and negative high frequency components marking the band edges of the digital modulation signal. To generate the timing signal the first and second Hilbert filters 500 and 508, respectively extract the positive and negative high frequency components. The complex product of one high frequency component with the complex conjugate of the other frequency component is produced by the combination of the complex multiplier 514 and the conjugate circuit 510. The phase detector 520 detects one complex component, for example, the imaginary component of the signal. The combination of the phase detector, the loop filter, and the timing circuit operate to drive this complex component to zero, and thus eliminating any timing offset.

When a QAM signal is to be received, the control signal CS is placed in a second state. In this case, the controllable I/Q swapper circuit 504 is conditioned to produce an output signal in which the real and the imaginary components of the input signal are swapped. That is, the signal at the real output terminal of the controllable I/Q swapper 504 is the signal from its imaginary input terminal, and the signal at the imaginary output terminal is the signal from its real input terminal. The first and second multiplexers 502 and 506 respectively are conditioned pass zero valued signals to the imaginary input terminals of their corresponding Hilbert filters 500 and 508 respectively. The complex multiplexer 516 is conditioned to couple the output of the first Hilbert filter 500 to the first phase detector 520 and the third multiplexer 518 is conditioned to couple the output of the second phase detector 512 to the subtractor 522. In this configuration, the combination of the first and second phase detectors 520 and 512, and the subtractor 522, operate as a single phase detector to produce the timing error signal that the timing loop operates to drive to zero.

In either arrangement, the Hilbert filters 500 and 508 extract positive and negative frequency band edge components of the digital television signal, and the phase detectors 512 and 520 produce a correction signal that controls the timing of the interpolation filter.

Figure 6:
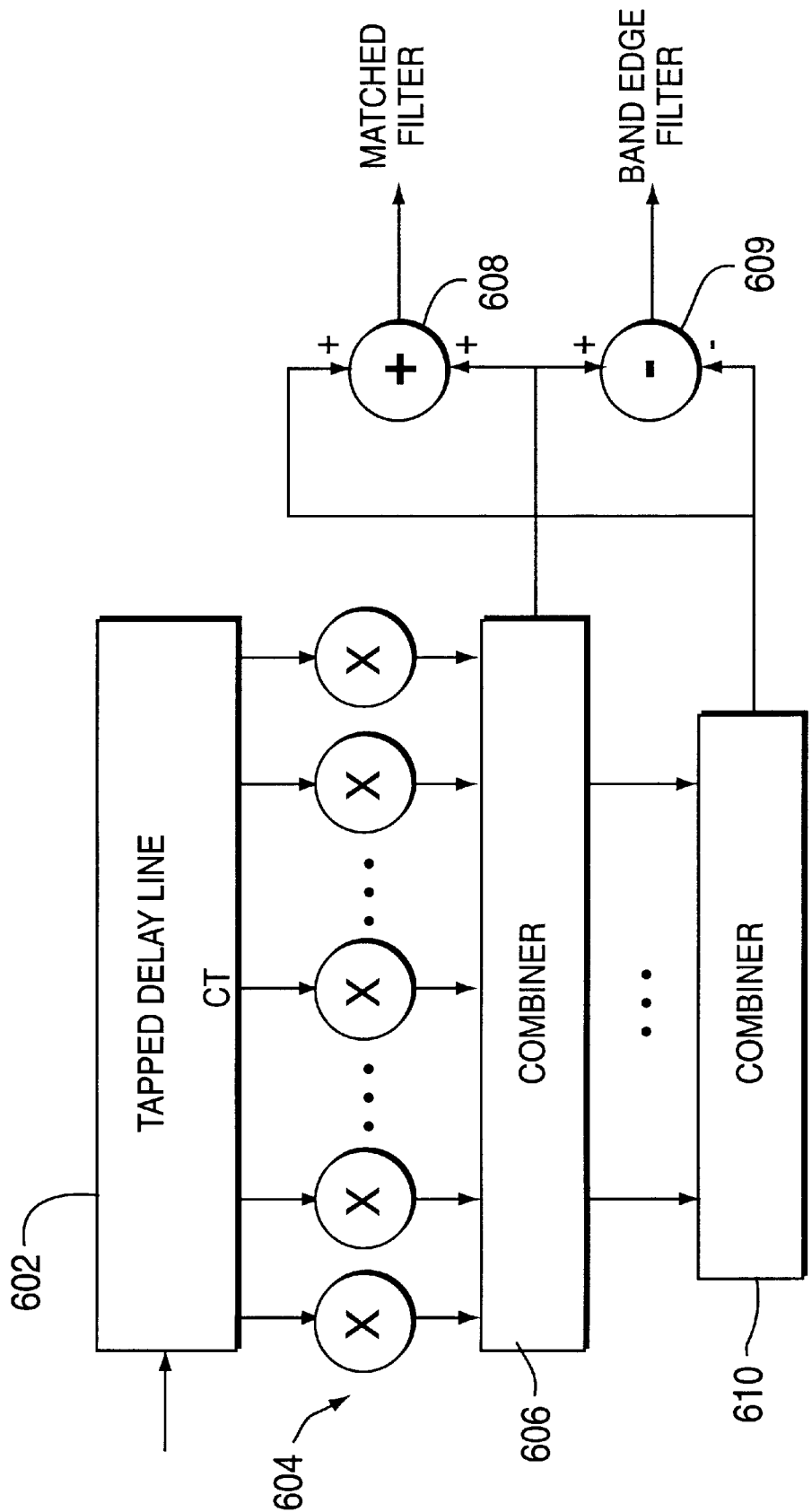
FIG. 6 depicts a block diagram of a matched/band edge filter.

FIG. 6 depicts a detailed block diagram of a matched band edge filter 402 for use in the television signal receiver illustrated in FIG. 1. An input terminal of a tapped delay line 602 is coupled to the output terminal of the demodulator 202 (in FIG. 2). The tapped delay line 602 includes a plurality of output terminals including even and odd taps and a center tap (CT), each producing copies of the signal at the input terminal delayed by respectively different time periods, in a known manner. Respective input terminals of a plurality of coefficient multipliers 604 are coupled to corresponding output terminals of the tap delay line. Respective output terminals of the coefficient multipliers coupled to the odd taps of the tap delay line, including the center tap, are coupled to corresponding input terminals of a first signal combiner 606. Respective output terminals of the coefficient multipliers coupled to the even taps of the tap delay line are coupled to corresponding input terminals of a second signal combiner 610. An output terminal of the first signal combiner 610 is coupled to the first input terminal of an adder 608 and a non-inverting input terminal of a subtractor 609. An output terminal of the second signal combiner 610 is coupled to a second input terminal of the adder 608 and an inverting input terminal of the subtractor 609. An input terminal of the adder 608 provides low pass filtered match filter output signal an output terminal of the subtractor provides the complimentary high pass filter band edge signal to the pilot and pix carrier tracking loop 206 (of FIG. 2).

In operation the filter arrangement of FIG. 6 provides complimentary low pass and, high pass filtered versions of the input signal. If the low pass filtered version has a frequency characteristic matched to the transmitted pulse, e.g., the filters are root-raised cosine filters with the 3 dB points at the symbol rate. The complimentary high pass filtered version is used to provide band edge timing recovery. In this matter, a single filter plus a single additional subtractor is used to provide both functions. This lowers the fabrication cost of the television receiver constructed in this matter.

Figure 7:
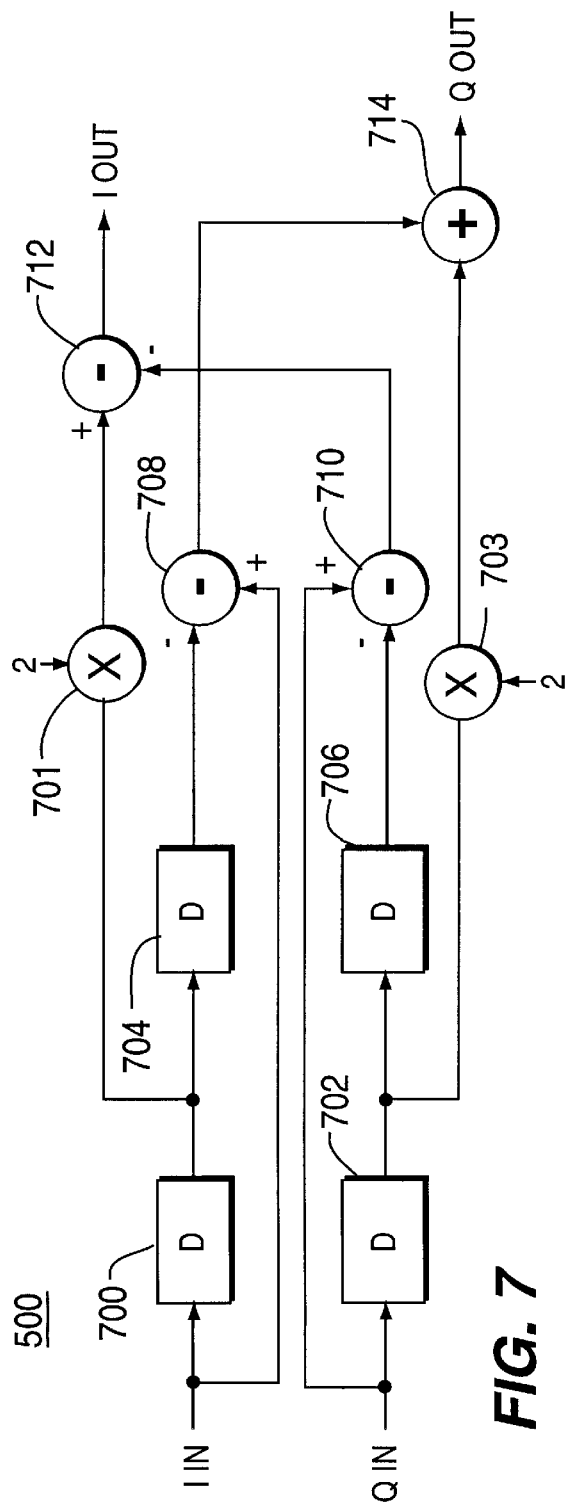
FIG. 7 depicts a block diagram of a Hilbert filter.

FIG. 7 depicts a detailed block diagram illustrating the form of Hilbert filter 500 used in the timing loop. The I input terminal is coupled to an input terminal with a first delay circuit 700 and to a non-inverting input terminal of a first subtractor 708. An output terminal of the first delay circuit 700 is coupled to an input terminal of a second delay circuit 704 and to an input terminal of a multiplier 701 that multiplies the input signal by two. The output of the multiplier is coupled to a non-inverting input terminal of a second subtractor 712. An output terminal of the second delay circuit 704 is coupled to an inverting input terminal of the first subtractor 708.

The Q input terminal is coupled to an input terminal of a third delay circuit 702 and to a non-inverting input of the third subtractor 710. An output terminal of the third delay circuit 702 is coupled to an input terminal of a fourth circuit 706 and to an input of a multiplier 703 that multiplies the input signal by two. The output of the multiplier is coupled to a first input terminal of an adder 714. An output terminal fourth delay circuit 706 is coupled to an inverting input terminal of a third subtractor 710. An output terminal is a first subtractor 708 is coupled to a second input terminal adder 714 and an output terminal of the third subtractor 710 is coupled to an inverting terminal of the second subtractor 712. An output terminal of the second subtractor 708 produces the real output signal I out, and an output terminal of the adder 714 produces the imaginary output signal Q out. The respective real and imaginary output terminals are coupled to corresponding input terminals of the circuitry within the timing loop. The positive Hilbert filter 500 that is illustrated operates in a known manner to extract positive high frequency components of the band edge signal from the matched filter. This Hilbert filter, however, does not utilize multipliers; but instead requires only delay circuit, adders and subtractors, all of which are relatively inexpensive, compared to multiplier circuits. A negative Hilbert filter 508, for extracting negative high frequency components, is constructed in a similar manner to that illustrated in FIG. 7 by reversing the signs on the input terminals of the subtractors 708 and 710.

Figure 8:
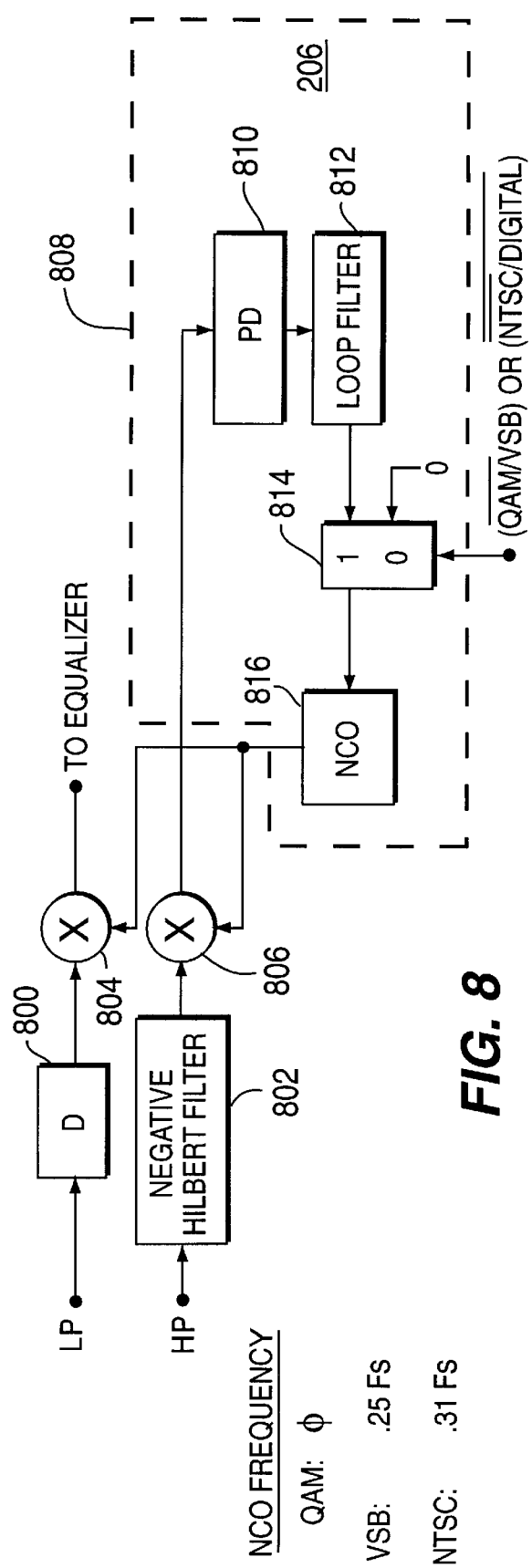
FIG. 8 depicts a block diagram of a pilot and pix carrier tracking loop.

FIG. 8 depicts a block diagram of the pilot and pix carrier tracking loop 206 of FIG. 2. This tracking loop 206 contains a one symbol period delay 800, a pair of multipliers 804 and 806, a negative Hilbert filter 802, and a carrier tracking loop 808. The circuitry is coupled to the complimentary low pass and high pass outputs of the matched band edge filter 402 of FIG. 4. The low pass input is coupled to the delay 800. The output of the delay is coupled to one input of the multiplier 804. The delay time is equivalent to the time required for the signal to pass through the Hilbert filter 802 which can be one or more symbol periods. The high pass filtered output is coupled to the negative Hilbert filter 802. The Hilbert filter is centered upon the visual carrier (pix) tone of an analog television signal and on the pilot tone for a VSB signal. The output of the Hilbert filter is coupled to one input of the second multiplier 806. The output of the first multiplier 804 is the output of the pilot and pix carrier tracking loop 206 which is coupled to the equalizer 208 (of FIG. 2). The carrier loop 808 is used to generate a timing signal for multiplier 804 such that the low pass filtered signal can be offset in frequency using a phase-locked signal such that a single equalizer can be used for filtering QAM, VSB, and analog television signals. To facilitate phase locking the offset signal, the carrier loop 808 contains a phase detector 810 that is coupled to the output of the multiplier 806, a loop filter 812, a multiplexer 814, and a numerically controlled oscillator 816. The phase detector detects the phase error in the timing signal that is generated by the multiplier 806 that multiplies the complex signal output of the NCO 816 with the output of the negative Hilbert filter 802. The loop filter 812 extracts the low frequency components from the phase detector's output signal. The multiplexer 814 enables and disables the carrier loop 808. For example, for QAM, there needs to be no offset of the low pass filtered input; therefore, the carrier loop is disabled and multiplier 804 passes the QAM signal to the equalizer unchanged. However, in the VSB and an analog television receiving modes the timing loop 808 is enabled to offset the low pass signal. As such, when QAM is being received multiplexer 814 has its output terminal coupled to the zero valued input terminal. For all other signals, the output of the loop filter is coupled through the multiplexer 814 to the NCO 816 to form a control voltage for the numerically controlled oscillator 816. The output of the oscillator is coupled to both multipliers 804 and 806. Nominally, for VSB signals, the output of the oscillator is set at 0.25 times the symbol frequency and, for analog signals, it is set for 0.125 times the symbol frequency. These specific values vary with sample frequency. In this manner, the high pass filter and the negative Hilbert filter extract the pilot (or pix) tone from the VSB and the NTSC signals such that the timing loop 808 is locked to those pilot (or pix) tones.

Figure 9:
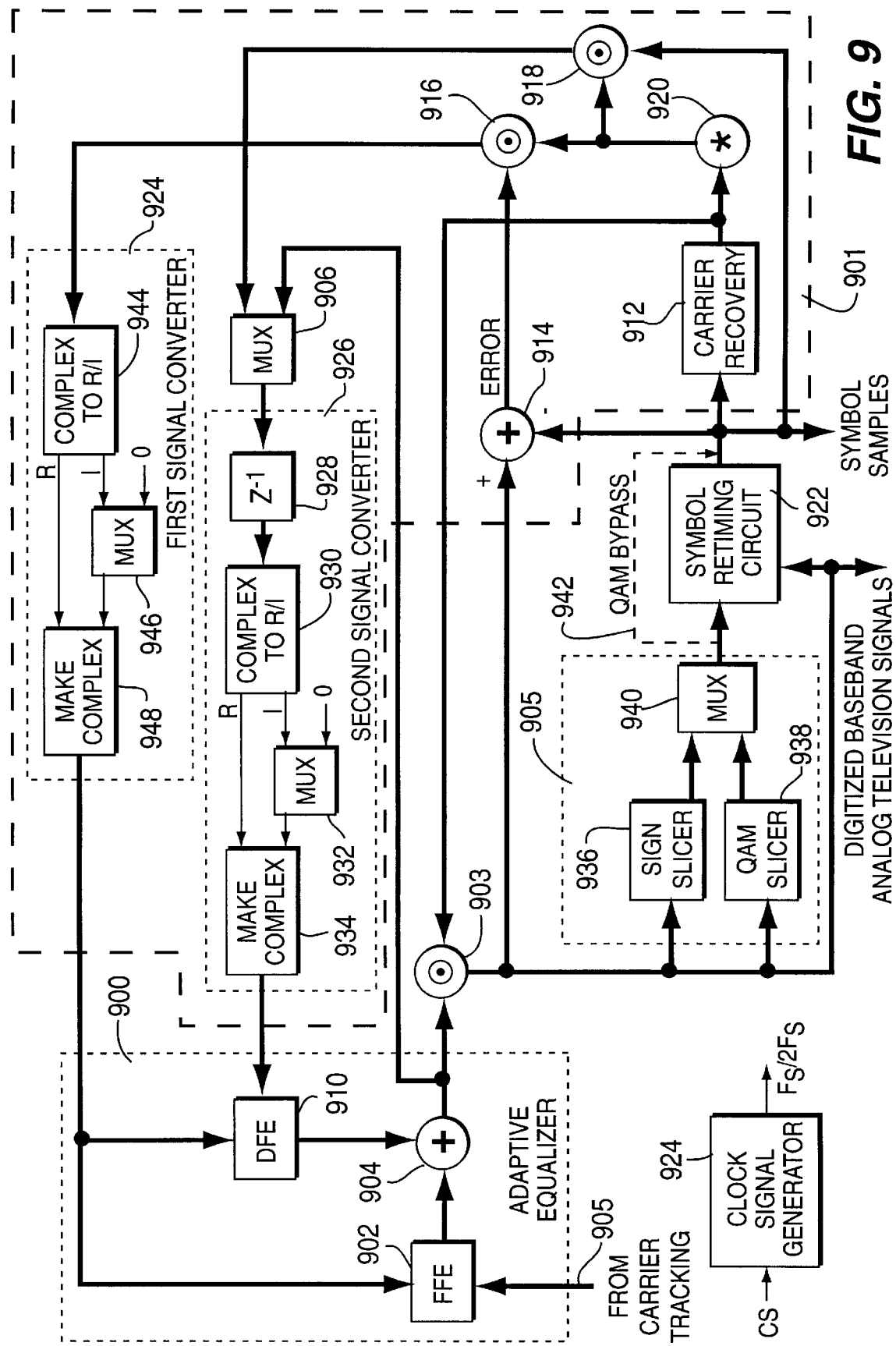
FIG. 9 depicts a block diagram of an passband equalizer.

FIG. 9 is a detailed block diagram of the passband equalizer illustrated in FIG. 2. The passband equalizer 208 contains an adaptive equalizer 900, a controller 901, a derotator 903, and a quantizer 905. The controller 901 sets the coefficients in the adaptive equalizer 900 upon initial signal acquisition, and adjusts the coefficients in response to changes in the channel during reception of the signal. The equalizer of the present invention is a "blind" equalizer, in that, it does not utilize a "training sequence" to initialize the filter coefficients. As such, the coefficients are adjusted in view of the equalizer's output signal. Although other algorithms are available for accomplishing blind equalization, the present invention when receiving QAM signals, uses the well-known constant-modulus algorithm (CMA), also known as the Godard Algorithm. When receiving VSB signals, the invention uses the well-known Sato blind equalization algorithm.

The adaptive equalizer 900 contains a feed forward equalizer (FFE) 902, and a selective decision feedback equalizer (DFE) 910. Additionally, the controller 901 contains a multiplexer 906, first and second signal converters 924 and 926, a complex conjugate circuit 920, a first rerotator 916, a second rerotator 918, an error generator 914 and a carrier recovery circuit 912. These elements are interconnected as follows. An input terminal 907 is coupled to the output terminal of the carrier tracking loop 206 (of FIG. 2). Input terminal 907 is coupled to an input terminal of the feed forward equalizer (FFE) 902. An output terminal of the FFE 902 is coupled to a first input terminal of a signal combiner 904. An output terminal of the signal combiner 904 is coupled to a first data input terminal of a multiplexer 906 of the controller 901 and the derotator 903. An output terminal of the multiplexer 906 is coupled to a data input terminal of the second signal converter 926. The second signal converter contains a one symbol delay 928, a "complex to real/imaginary" signal converter 930, a multiplexer 932, and a "make complex" circuit 934. The delayed complex signal is coupled to the complex signal converter 930 to extract real and imaginary signals from the complex signal. The real signal is coupled directly to the real input of the make complex circuit 934. The imaginary signal is coupled to a first input of multiplexer 932. The second input is coupled to zero. During QAM reception, the imaginary signal is selected and coupled to the multiplexer output terminal. However, during VSB/OQAM reception, the multiplexer supplies no signal to the imaginary terminal of the make complex circuit 934. The make complex circuit 934 converts the real and imaginary signals into a complex signal for use by the DFE 910. An output terminal of the DFE 910 is coupled to a second input terminal of the signal combiner 904.

An output terminal of the derotator 903 is coupled to an input terminal of the quantizer 905. The quantizer contains a sign slicer 936, QAM slicer 938 and a multiplexer 940. The multiplexer selects as an output of the quantizer either the sign value or the symbol value. In VSB/OQAM/analog mode, the quantizer begins with only the sign value until the Sato algorithm has achieved equalization, then the quantizer is switched to the QAM slicer to provide symbol samples. In the QAM mode, the quantizer is always set to perform QAM slicing. The QAM slicer is selected to quantize the maximum expected constellation size, e.g., a 256-QAM slicer.

The output of the multiplexer is coupled to the symbol retiming circuit 922.

The symbol retiming circuit 922 is used during VSB/OQAM mode only. During QAM mode, the circuit is bypassed as indicated by dashed arrow 942. The symbol retiming circuit is described in detail with respect to FIG. 10 below. The output terminal of circuit 922 is coupled to a first input of a carrier recovery circuit 912, to a first input terminal of the error generator 914 and to an input terminal of the rerotator 916. An output terminal of the quantizer 905 is coupled to a second input terminal of the carrier recovery circuit 912, to a second input terminal of the error generator 914, and to a data input terminal of a first rerotator 916. An output terminal of the first rerotator 916 is coupled to a second data input terminal of the multiplexer 906. An output terminal of the error generator 914 produces an error signal and is coupled to a data input terminal of a second rerotator 918. An output terminal of the second rerotator 918 is coupled to the first signal converter 924. The first signal converter contains a complex to real/imaginary converter 944, a multiplexer 946, and a make complex circuit 948. As with the second signal converter 926, this converter converts the complex input signal into real and imaginary signals, couples the real signal to the make complex circuit 948, selectively couples the imaginary signal to the make complex circuit 948, and produces a complex signal. The multiplexer selects the imaginary component during QAM mode and no signal during VSB/OQAM/analog mode. The complex output from converter 924 is coupled to respective control input terminals of DFE 910 and FFE 902.

An output terminal of the carrier recovery circuit 912 is coupled to a control input terminal of the derotator 903, and to an input terminal of a complex conjugate circuit 920. An output terminal of the complex conjugate circuit 920 is coupled to respective control input terminals of the first and second rerotators 916 and 918.

In operation, the adaptive equalizer 900, including the FFE 902, the DFE 910 and the signal combiner 904, operate on an input signal on path 905 in the passband, before the carrier signal has been recovered. The remainder of the circuit, including the quantizer 907, the error generator 914, and the carrier recovery circuit 912, operate at baseband. The derotator 903 performs the translation from the passband to the baseband under the control of the carrier recovery circuit 912.

For QAM, the adaptive equalizer 900 uses the known constant modulus algorithm (CMA) technique for adapting its coefficients to a newly received signal. For VSB/OQAM, the equalizer uses the Sato blind equalization algorithm to equalize the sign bit before switching to the CMA algorithm to equalize the symbol data. The algorithms use an equalization criterion that depends on the amount of intersymbol interference at the output of the equalizer, but is independent of the symbol constellation size and carrier phase. In order to simultaneously adapt the coefficients of both the FFE 902 and the DFE 910 during initial signal acquisition, the multiplexer 906 is conditioned to couple the output of the signal combiner 904 to the input terminal of the DFE 910 during the signal acquisition period. Thus, during the signal acquisition period, the FFE 902 and DFE 910 operate as a finite impulse response filter (FIR) and an infinite impulse response (IIR) filter, respectively. In the analog mode, the passband equalizer operates as a ghost suppression circuit wherein the output of the combiner 904 is coupled through multiplexer 906 and signal converter 926 to the DFE 910.

This arrangement provides two advantages. First, the DFE 910, operated as an IIR, provides better ISI cancellation during the signal acquisition period than the FFE 902 alone provides. Thus, the decisions made by the quantizer 905 after the coefficients in the adaptive equalizer have converged (in a manner to be described in more detail below) are likely to be more accurate than those in the prior art arrangement, and subsequent data recovery will, therefore, more likely proceed properly. Second, there is no migration of coefficients from the FFE 902 to the DFE 910 after the signal acquisition period. This results in a simpler circuit structure with simpler controlling circuitry that is available in the prior art.

The equalized signal from the adaptive equalizer 900 is a passband signal. During normal operations, this signal is translated into the baseband by the operation of the derotator 903 under the control of the carrier recovery circuit 912 (described in more detail below). The baseband signal from the derotator 903 is then processed by the symbol retiming circuit 922 and the quantizer 907 to generate estimated received symbols, which correspond to the transmitted symbols.

However, during the signal acquisition period, after the coefficients of the adaptive equalizer 900 have converged (as described above), the carrier signal must be acquired, in a manner to be described in more detail below. During this carrier recovery period, the FFE 902 and DFE 910 remain in the FIR/IIR arrangement. To achieve carrier recovery for the various digital modulation formats, a symbol retiming technique must be used, otherwise quantization may occur between symbol locations for some of the modulation formats that the receiver is intended to process. As such, the present invention includes a symbol retiming circuit 922 that corrects the symbols at baseband to ensure the baseband sequence is appropriate for quantization and carrier recovery no matter which digital modulation format is being received. For analog signal reception, the carrier recovery circuit produces a fixed oscillator frequency.

Figure 10:
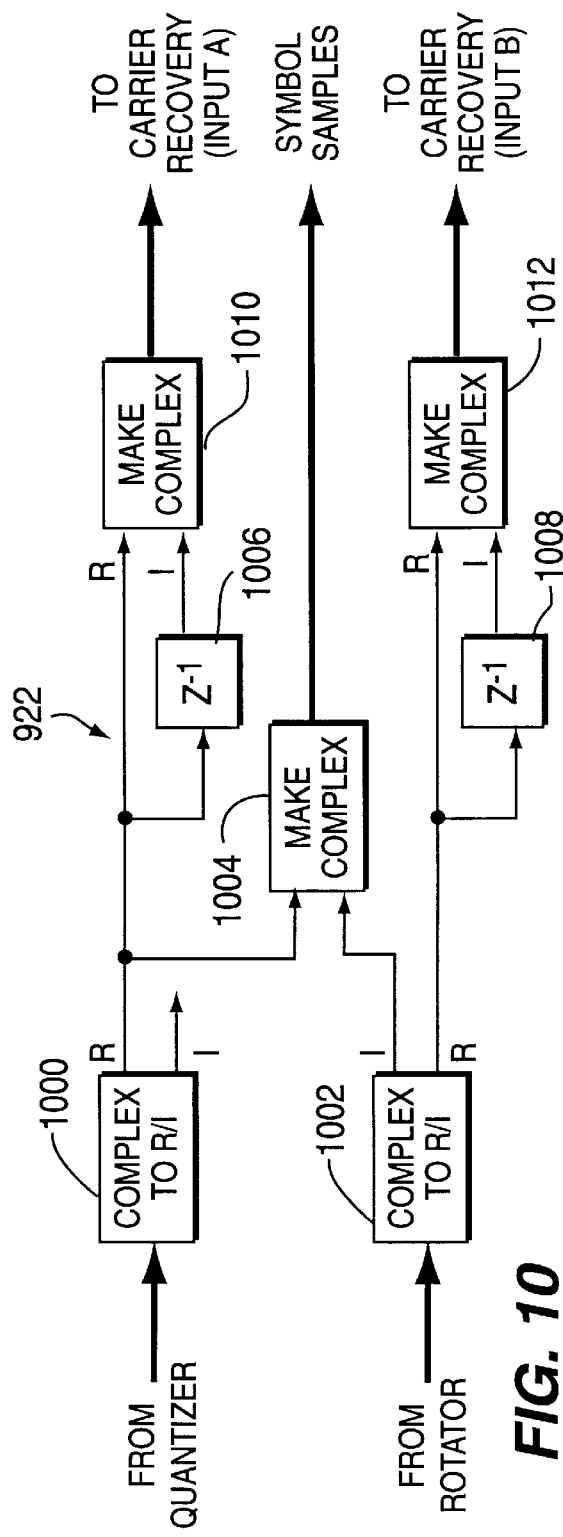
FIG. 10 depicts a block diagram of a symbol retiming circuit.

Specifically, FIG. 10 depicts a detailed block diagram of the symbol retiming circuit 922 of FIG. 7. The retiming circuit 922 contains a pair of complex to real/imaginary converters 1000 and 1002, a make complex circuit 1004, a pair of one symbol delays 1006 and 1008, and a pair of make complex circuits 1010 and 1012. The complex signal from the quantizer (905 of FIG. 9) is coupled to the converter 1000 to produce the real and imaginary components of the quantized signal. The real component is coupled to the real input terminals of make complex circuits 1010 and 1004. The real component is also coupled to delay 1008 (one symbol period). The output of the delay is coupled to the imaginary input of the make complex circuit 1010. The complex signal from circuit 1010 forms one input (A input) to the carrier recovery circuit (912 of FIG. 9).

A complex signal from derotator 903 is coupled to complex to real/imaginary converter 1002. The imaginary output of converter 1002 is connected to circuitry 1004. This circuit produces the symbol samples. The real output of converter 1002 is coupled to the real input of make complex circuit 1012 and an input to delay 1006. The output of delay 1006 forms the imaginary input of circuit 1012. The complex signal generated by circuit 1012 is coupled to input B of the carrier recovery circuit (912 of FIG. 9).

Figure 11:
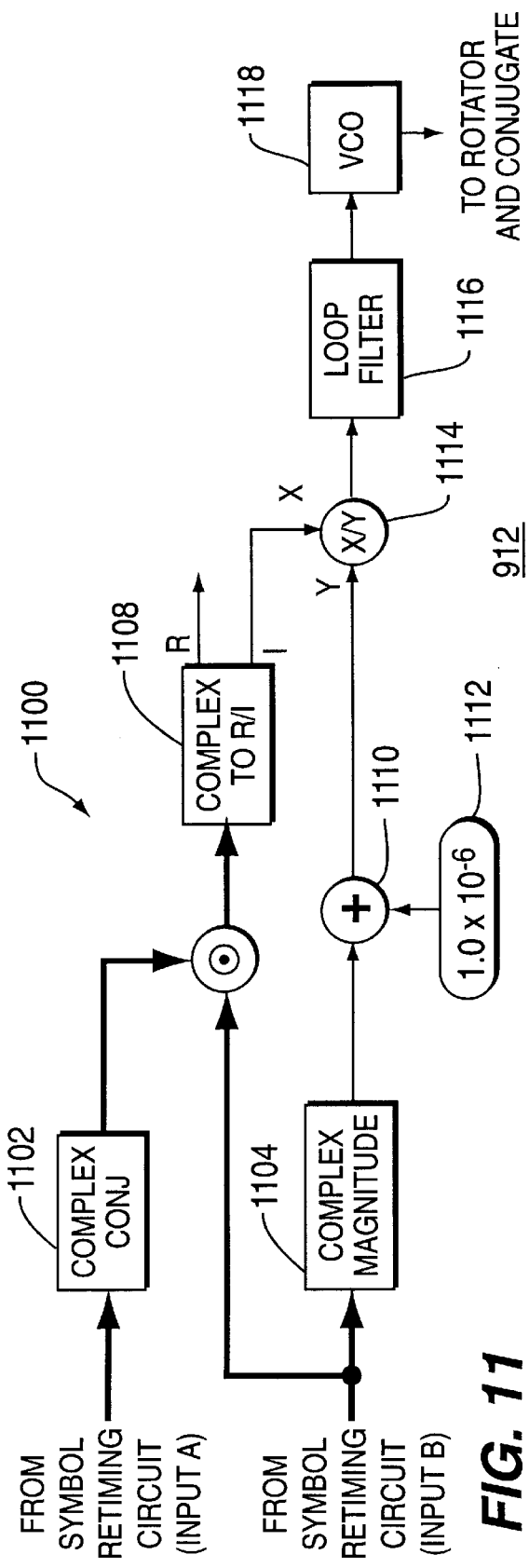
FIG. 11 depicts a block diagram of a carrier and recovery circuit.

FIG. 11 depicts a detailed block diagram of the carrier recovery circuit 912 illustrated in FIG. 9. The carrier recovery circuitry tracks the phase of the carrier signal based on the decisions made by the quantizer 905. This circuitry is clocked at one rate for receiving QAM signals (e.g., rate $F_s$) and at double the QAM clocking rate for receiving VSB and OQAM signals (e.g., rate $2F_s$). The carrier recovery circuit contains a phase detector 1100, a loop filter 1116 and a VCO 1118. A first input terminal (Input A) is coupled from the symbol retiming circuit (922 in FIG. 9 and 10) to a complex conjugate circuit 1102. The output of the circuit 1102 is coupled to one input of rerotator 1106. A second input terminal (Input B) is coupled from the symbol retiming circuit to a complex magnitude circuit 804 and a second input of rerotator 1106. The output of the rerotator is coupled to the complex to real/imaginary converter 1108. The real component is ignored and the imaginary component is coupled to the x terminal of and x/y divider 1114. The output of the complex magnitude circuit 1104 that produces the magnitude of the signal at input B is added to a constant (e.g., $1.0 \times 10^{-6}$) using adder 1110. The output of the adder is the y input of the x/y divider 1114. The foregoing circuitry is a phase detector that produces a phase error signal for both QAM and VSB/OQAM signals.

The output of the phase detector 1100 is connected to a loop filter 1116 that produces a low frequency (e.g., DC) signal for controlling the VCO 1118. The output is a phase locked frequency that is used for derotating and rerotating the signals within the passband equalizer (208 of FIG. 1).

Although various embodiments which incorporate the teachings of the present invention have been shown and described in detail herein, those skilled in the art can readily devise many other varied embodiments that will still incorporate these teachings.

What is claimed is:

1. A receiver for demodulating both analog and digital television signals comprising:

a signal processor for processing said analog and digital television signals into complex signals, where said complex signals derived from said analog television signals and said complex signals derived from said digital television signals have a common center frequency; and a single passband equalizer, coupled to said signal processor, for providing both intersymbol interference suppression for said digital television signals and ghost suppression for said analog television signals.

2. The receiver of claim 1 wherein said passband equalizer further comprises:

an adaptive equalizer for producing an equalized signal;

an equalizer control circuit, coupled to said adaptive equalizer, for initializing and updating parameters of said adaptive equalizer;

a derotator, coupled to said adaptive equalizer and said equalizer control circuit, for derotating the equalized signal to form a baseband signal; and a quantizer, coupled to said derotator, for quantizing said baseband signal to produce a quantized symbol.

3. The passband adaptive equalizer of claim 2 wherein said adaptive equalizer comprises:

a feed forward equalizer, coupled to said equalizer control circuit and having an output terminal coupled to a signal combiner; and a decision feedback equalizer, coupled to said equalizer control circuit and having an output terminal connected to said signal combiner, where an output signal of said signal combiner is the equalized signal.

4. The passband adaptive equalizer of claim 3 wherein the adaptive equalizer has coefficients that are adjusted using blind equalization in accordance with a constant modulus algorithm.

5. The passband adaptive equalizer of claim 2 wherein the equalizer control circuit further comprises:

an error generator, coupled to the quantizer and the derotator for producing an error signal;

a rotator, coupled to said error generator, for rotating the error signal and coupling the rotated error signal to the adaptive equalizer.

6. The passband adaptive equalizer of claim 3 wherein the feed forward equalizer is a finite impulse response filter and the decision feedback equalizer is an infinite impulse response filter.

7. The passband adaptive equalizer of claim 1 wherein the digital television signal is a quadrature amplitude modulated (QAM) signal, a vestigial sideband (VSB) modulated signal, or a offset QAM (OQAM) signal and said analog television signal complies with the NTSC, SECAM or PAL signal formats.

8. A receiver for demodulating both analog and digital television signals comprising:

an RF/IF front end for converting said analog and digital television signals into near baseband signals;

a free running analog-to-digital converter connected to said RF/IF front end, for digitizing said near baseband signals;

a quadrature demodulator, connected to said A/D converter, for producing I-data and Q-data;

an interpolation filter, connected to said quadrature demodulator, for resampling said I-data and Q-data derived from digital television signals and using an asynchronous resampling signal for I-data and Q-data derived from analog television signals;

a matched/Nyquist filter, connected to said interpolation filter, for matched filtering said resampled I-data and Q-data to produce a low pass I-data and Q-data and for band edge filtering said resampled I-data and Q-data to produce high pass I-data and Q-data;

a resampling timing loop, connected to said matched/Nyquist filter, for producing a synchronous resampling signal from said high pass I-data and Q-data;

a carrier tracking loop, coupled to said matched/Nyquist filter, for phase locking an oscillator to a carrier in the high pass I-data and Q-data;

a passband equalizer, coupled to said carrier tracking loop, for filtering said low pass I-data and Q-data, where said equalizer removes ghosting when said low pass I-data and Q-data is derived from analog television signals and removes intersymbol interference when said low pass I-data and Q-data is derived from digital television signals; and a quantizer, coupled to said equalizer, for producing quantized symbols from said equalized I-data and Q-data that is derived from said digital television signals.

9. The receiver of claim 8 wherein said analog television signal complies with NTSC, SECAM or PAL formats and said digital television signal is QAM, OQAM or VSB.

10. The receiver of claim 8 wherein said matched/Nyquist filter comprises:

a tapped delay line having odd and even taps and a center tap;

a weighting multiplier array for weighting values of said taps;

a first combiner connected to said weighting multiplier array, for combining the weighted values of said odd taps and the center tap to form a first combined value;

a second combiner, connected to said weighting multiplier array, for combining the weighted values of said even taps to form a second combined value;

an adder, coupled to said first and second combiners for adding the first combined value to said second combined value to form a matched filter output; and a subtractor, coupled to said first and second combiners, for subtracting the second combined value from the first combined value to form a band edge filter output.

11. The receiver of claim 8 wherein said carrier tracking loop comprises:

a negative Hilbert filter, coupled to said high pass I-data and Q-data, for extracting a carrier signal from said I-data and Q-data;

a mixer, coupled to said negative Hilbert filter and an oscillator, for producing a phase error signal representing a phase difference between said carrier signal and an oscillator signal;

a phase detector coupled to said mixer for producing an error signal from said phase of difference;

a loop filter, coupled to said phase detector, for filtering said error signal and for producing a control signal for said oscillator.

12. The receiver of claim 11 wherein said carrier tracking loop further comprises:

a second mixer, having one input coupled to said oscillator and a second input coupled to the low pass I-data and Q-data from said matched/Nyquist filter, for altering a center frequency of said low pass I-data and Q-data.

13. The receiver of claim 12 wherein said passband equalizer comprises:

a feed forward equalizer (FFE) and a decision feedback equalizer (DFE) that operate in the passband.

14. The receiver of claim 8 further comprising an automatic gain control (AGC) circuit, coupled to said A/D converter, for generating an AGC control signal in response to said digitized near baseband signals derived from either analog television signals or digital television signals.

15. The receiver of claim 14 wherein said AGC circuit is selectively enabled to operate during a synchronization interval of the analog television signal.

16. The receiver of claim 8 further comprising:

an analog television signal processor, coupled to said passband equalizer, for processing said equalized signal to produce a video signal and an audio signal; and a digital decoder, coupled to said quantizer, for processing said quantized symbols to produce a video signal and an audio signal.

17. A receiver for receiving signals having digital modulation formats including quadrature amplitude modulated (QAM) signals, vestigial sideband (VSB) modulated signals, or offset QAM (OQAM) signals and analog modulation formats including National Television Systems Committee (NTSC) signals comprising:

an analog-to-digital (AID) converter for digitizing received signals;

a quadrature demodulator, coupled to said A/D converter, for producing a complex signal in response to the digitized received signal;

a matched filter, coupled to said quadrature demodulator, for filtering said complex signal;

a carrier tracking circuit, coupled to said matched filter, for locking an oscillator to a carrier signal within said complex signal whenever said complex signal contains said carrier signal and for adjusting a center frequency of said complex signal having said carrier frequency, where complex signals having a carrier frequency and complex signals that do not have a carrier frequency have a common center frequency;

a passband adaptive equalizer, coupled to said carrier tracking circuit, for equalizing said complex signal, where said passband adaptive equalizer comprises a feed forward equalizer (FFE), a decision feedback equalizer (DFE); and a signal combiner, coupled to said DFE and FFE, for combining output signals from the DFE and FFE to form an equalized signal;

a derotator, coupled to said equalizer, for converting said equalized signal to a baseband signal;

a quantizer, coupled to said derotator, for quantizing the baseband signal to produce symbol samples;

a symbol retiming circuit, coupled to said quantizer and said derotator, for retiming said symbols samples that are generated from received signals being either VSB or OQAM signals and being bypassed for QAM received signals;

a carrier recovery circuit, coupled to said symbol retiming circuit and said rotator, for locking an oscillator to said retimed symbol samples or said symbol samples;

an error generator, coupled to said derotator and said symbol retiming circuit, for generating an error signal in response to said symbol samples or retimed symbol samples and said baseband signal;

a rotator, coupled to said error generator, for rotating said error signal;

a signal converter, coupled to said rotator and said adaptive equalizer, for converting said rotated error signal into a control signal for said equalizer;

a rotator, coupled to said symbol retiming circuit, for rotating said symbol samples or said retimed symbol samples;

a multiplexer, coupled to said adaptive equalizer and said rotator, for selecting either the equalized complex signal or the rotated symbol or retimed symbol samples as a multiplexer output signal; and a second signal converter, coupled to said multiplexer and said adaptive equalizer, for converting said multiplexer output signal into an input signal for said DFE.

18. The system of claim 17 wherein the passband adaptive equalizer has coefficients that are adjusted using blind equalization in accordance with a constant modulus algorithm.

19. The receiver of claim 18 wherein said signal converter comprises:

a complex to real/imaginary converter for converting the rotated error signal into real and imaginary components;

a multiplexer, coupled to the complex to real/imaginary converter, for selecting the imaginary component when a QAM signal is received and no signal when a VSB, OQAM, or an analog signal is received; and a make complex converter, coupled to the complex to real/imaginary converter and the multiplexer, for converting the real component and selected signal into the control signal for the passband adaptive equalizer.

20. The receiver of claim 19 wherein the second signal converter further comprises:

a delay for delaying said multiplexer output signal;

a complex to real/imaginary converter, coupled to said delay, for converting the delayed signal into real and imaginary components;

a multiplexer, coupled to the complex to real/imaginary converter, for selecting the imaginary component when a QAM signal is received and no signal when a VSB, OQAM, or analog signal is received; and a make complex converter, coupled to the complex to real/imaginary converter and the multiplexer, for converting the real component and selected signal into the input signal for the DFE.

* * * * *